Nov. 22, 1966  H. R. BROWN  3,286,425
JOINT SEALS
Filed June 19, 1964
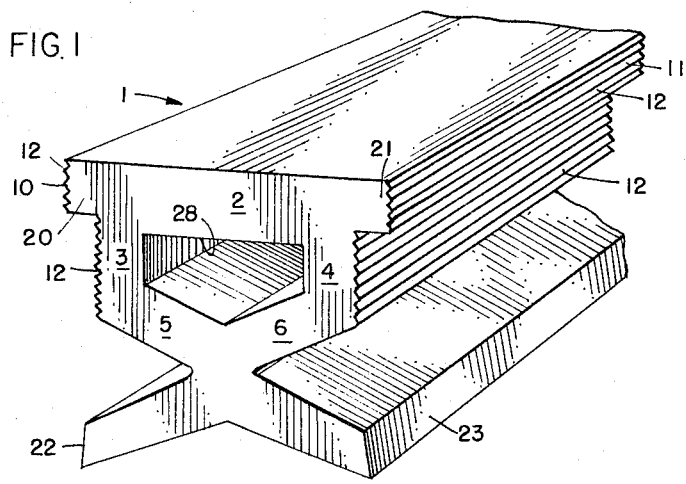
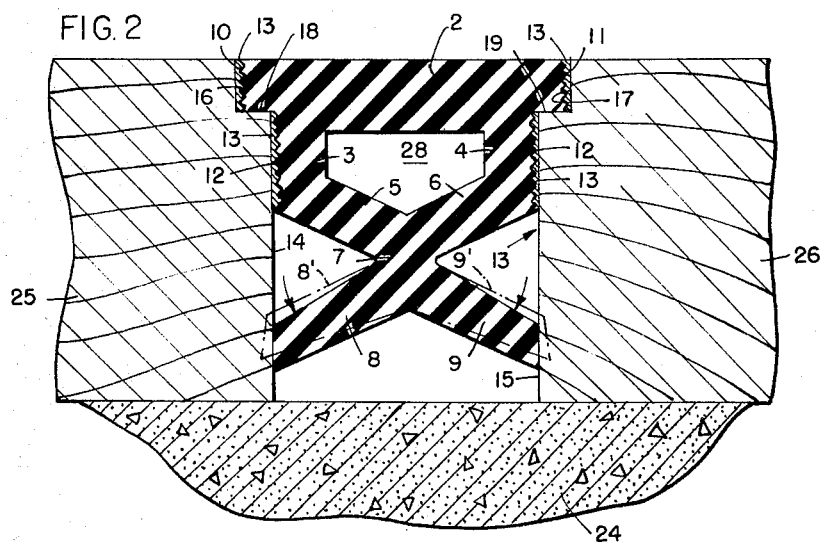
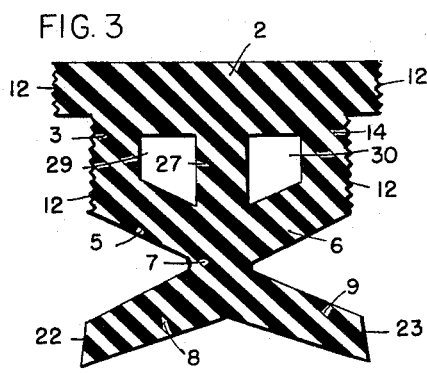
INVENTOR:
HOWARD R. BROWN United States Patent Office 3,286,425
Patented Nov. 22, 1966

3,286,425
JOINT SEALS
Howard R. Brown, Bowling Green, Ohio, assignor to The D. S. Brown Company, North Baltimore, Ohio, a corporation of Ohio
Filed June 19, 1964, Ser. No. 376,459
4 Claims. (Cl. 52—396)

This invention, in general, relates to joint seals and, more particularly, pertains to elastomer strip members especially adapted for service as a seal for expansion and contraction joints of sections of a floor, wall or the like.

Joint seals for expansion and contraction joints for concrete highways, bridges, air strips and the like are well-known. The joint seals of this invention pertain primarily to seals for spacings between sections of building walls, floors and the like, which joints close and open as the sections expand and contract under changing conditions of temperature and/or moisture content of the floor or wall.

The joint seals of the invention comprise an extruded elastomer strip having a hollow T-shaped upper portion and a lower portion comprising downwardly and outwardly diverging legs. The latter legs are adapted to grip the side walls of the expansion and contraction joint while the upper, cross leg of the T-shaped upper portion is adapted to seat in recessed, upper corner portions of the expansion and contraction joint to seat the strip flush with the floor or wall surface and also to prevent the seal strip from falling into the joint when the joint expands.

It is a primary object of the invention to provide improvements in structures of extruded elastomer strips especially adapted to seal expansion and contraction joints.

Another primary object is to provide improvements in elastomer strip-sealed expansion and contraction joints.

A further object is to provide extruded elastomer seal strips with legs or the like adapted to bear against the side walls of an open joint and hold the seal strips in the joint.

Another object is to provide elongated, elastomer joint seals having a hollow T-shaped upper portion and a lower portion comprising outwardly and downwardly diverging, resilient legs adapted to function as members to hold the elongated joint seal in a joint of liquid, dirt, etc.

The foregoing objectives and advantages of the invention, as well as others hereinafter described or inherent in the invention, may be realized with the preferred embodiments of the invention illustrated in the drawings wherein:

FIG. 1 is a perspective view of a short length of an embodiment of extruded, elastomer, seal strip of the invention;

FIG. 2 is a sectional view transversely through a floor expansion and contraction joint with the seal strip of FIG. 1 mounted therein; and FIG. 3 is a transverse sectional view of a modified form of extruded, elastomer, seal strip of the invention.

Referring to the drawings, the elongated, elastomer seal strip 1 is composed entirely of extruded elastomer, i.e., a natural or synthetic rubber. It comprises an upper, transverse plate or web segment 2 and parallel, spaced downwardly-depending webs or legs 3, 4 from which extend at the bottom sides thereof inwardly-directed, converging webs or legs 5, 6 joining at the junction 7. The remainder of the seal strip comprises the downwardly and outwardly sloping legs 8, 9. The opposite, longitudinal edges 10, 11 of the plate or web 2 have longitudinal grooves 12. The outer sides of webs 3, 4 have similar grooves 12. These grooves are provided to form pockets for adhesive applied thereon when the strip is inserted in the expansion and contraction joint 13 to seal the space between the side walls 14, 15 of the joint and also between the side walls 16, 17 of the longitudinally extending offsets in the upper corners of the expansion joint. The offsets form shoulders 18, 19 on which are seated the longitudinally-extending, laterally-projecting lips 20, 21 formed by the laterally-projecting portions of the upper plate or web 2.

The legs 8, 9 are formed so that they are in the positions 8', 9' shown in phantom in FIG. 2 prior to being inserted in the joint. In this state, their outermost, wall-contracting edges 22, 23 extend laterally beyond the plane of the grooved, outer sides of walls 3, 4. The resilient legs 8, 9 are sprung inwardly when they are inserted into the joint. Their edges 22, 23 are urged tightly against walls 14, 15 and hold the seal strip against rising out of the joint by the friction between said edges and walls. This frictional resistance force becomes even greater when the joint contracts.

The floors or walls with expansion and contraction joints of the character shown may be any of several types, i.e., an all-concrete floor, a concrete base with a wooden overlay, wooden floors, terrazzo floors, etc. The floor is illustrated as a floor composed of a concrete base 24 with an overlay of wood sections 25, 26 with the aforesaid joints between the latter.

The embodiment of FIG. 3 is similar to that of FIG. 1 and like numerals have been used to designate like parts. The embodiment of FIG. 3 differs from that of FIG. 1 in the provision of a vertically-extending support web 27 dividing the longitudinal channel 28 of FIG. 1 defined by the inner sides of the webs 2–6 into two longitudinally-extending channels 29, 30. The vertical web 27 is a support wall for the upper web or plate 2 to reinforce the latter against collapse if the web or plate 2 does not have sufficient self-rigidity to support anticipated loads which might be placed thereon.

The webs 2, 5 and 6, as well as legs 8, 9, form flexible walls which flex as the expansion and contraction joint opens and closes. The edges 10, 11 and outer sides of webs 3, 4 are spaced apart the approximately maximum, anticipated opening of the joint so that the seal will be seated tightly in the joint under all conditions of its expansion and contraction—thereby maintaining an effective seal against penetration of dirt, liquid, etc., into the joint.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A joint seal comprising an elongated elastomer strip having an elastomer, upper web, a pair of spaced, elongated, elastomer side webs depending from said upper web and spaced inwardly from the longitudinal side edges of said upper web to provide laterally projecting edges on said upper web, a pair of elongated, downwardly and inwardly extending, converging elastomer webs extending from the bottom portions of said side webs to a junction of said converging webs, and a pair of downwardly and outwardly extending, elongated elastomer legs extending from said junction, the outermost edges of said legs extending beyond the planes of the outer walls of said side webs.

2. A joint seal as claimed in claim 1 wherein an elongated, vertical, elastomer web extends between said junction and said upper web.

3. A joint seal as claimed in claim 1 wherein the laterally outer sides of said side webs and the laterally outer edges of said upper web have longitudinally-extending grooves therein.

4. A floor joint comprising a plurality of spaced apart floor sections, the spaces between said sections defining elongated expansion and contraction joints, the upper corners of said sections at said joints being recessed to provide elongated shoulders along the upper edges of said joints, each of said joints being sealed by an elongated elastomer strip having an elastomer, upper web, a pair of spaced, elongated, elastomer, side webs depending from said upper web and spaced inwardly from the longitudinal side edges of said upper web to provide laterally projecting edges on said upper web, a pair of elongated, downwardly and inwardly extending, converging elastomer webs extending from the bottom portions of said side webs to a junction of said converging webs, and a pair of downwardly and outwardly extending, elongated elastomer legs extending from said junction, the outermost edges of said legs extending beyond the planes of the outer walls of said side webs when in an inoperative position, said laterally projecting edges being seated in said recessed upper corners, said side webs being in substantial contact with the walls of opposing floor sections in said joint, and said legs being resiliently deformed with the laterally outermost edges of said legs in tight contact with said walls of opposing sections.

References Cited by the Examiner
UNITED STATES PATENTS 2,156,681    5/1939    Dewhirst et al. _____ 52—396 X

FOREIGN PATENTS 553,707    1/1957    Belgium.
956,706    4/1964    Great Britain.

HARRISON R. MOSELEY, *Primary Examiner.*

P. C. KANNAN, *Assistant Examiner.*